US008892827B2

(12) United States Patent
Bernhard, III et al.

(10) Patent No.: US 8,892,827 B2
(45) Date of Patent: Nov. 18, 2014

(54) COOPERATIVE MEMORY MANAGEMENT

(75) Inventors: Leroy Francis Bernhard, III, Mountain View, CA (US); Lionel Divyang Desai, San Francisco, CA (US); Matthew Harris Jacobson, Sparta, NJ (US)

(73) Assignee: Apple Inc., Cupertino, CA (US)

( * ) Notice: Subject to any disclaimer, the term of this patent is extended or adjusted under 35 U.S.C. 154(b) by 685 days.

(21) Appl. No.: 12/987,043

(22) Filed: Jan. 7, 2011

(65) Prior Publication Data

US 2012/0179882 A1 Jul. 12, 2012

(51) Int. Cl.
*G06F 12/02* (2006.01)
*G06F 12/12* (2006.01)
*G06F 9/50* (2006.01)

(52) U.S. Cl.
CPC .................................. *G06F 9/5022* (2013.01)
USPC .................... 711/156; 711/171; 711/E12.002

(58) Field of Classification Search
USPC .................................................. 711/156, 171
See application file for complete search history.

(56) References Cited

U.S. PATENT DOCUMENTS

| 6,963,957 | B1 | 11/2005 | Kundu et al. | |
|---|---|---|---|---|
| 7,475,093 | B2 | 1/2009 | Tomic et al. | |
| 7,552,293 | B2 | 6/2009 | Van Riel et al. | |
| 2007/0226417 | A1 | 9/2007 | Davis | |
| 2007/0294501 | A1* | 12/2007 | Wolf et al. | 711/170 |
| 2008/0168235 | A1* | 7/2008 | Watson et al. | 711/135 |

OTHER PUBLICATIONS

Sitaram Iyer et al., "Application-assisted physical memory management", 5 pgs.
U.S. Appl. No. 11/620,688, titled "Memory Management Methods and Systems", by inventor Matt Watson, filed Jan. 7, 2007, 56 pages (specification and drawings).

* cited by examiner

*Primary Examiner* — Kenneth Lo
(74) *Attorney, Agent, or Firm* — Blakely, Sokoloff, Taylor & Zafman LLP

(57) ABSTRACT

A method and an apparatus for selecting one or more applications running in a data processing system to reduce memory usage according to information received from the applications are described. Notifications specifying the information including application specific memory management capabilities may be received from the applications. A status of memory usage indicating lack of available memory may be determined to notify the selected applications. Accordingly, the notified applications may perform operations for application specific memory management to increase available memory.

17 Claims, 7 Drawing Sheets

600

Sending a request for allocating memory for an application in a data processing system, the application including routines for application specific memory management 601

Sending a notification indicating capabilities for the application specific memory management 603

In response to receiving a message indicating lack of available memory in the data processing system, invoking the routines to reduce memory allocated for the application 605

COOPERATIVE MEMORY MANAGEMENT

FIELD OF INVENTION

The present invention relates generally to memory management systems. More particularly, this invention relates to cooperative memory management among processes in both user and kernel space.

BACKGROUND

One of the key computational resources for a computer application is memory space. Typically, multiple applications may run concurrently competing for accessing available physical memory via a memory manager in a system. When the size of memory space to support the running applications exceeds the size limit of the physical memory of the system, the memory manager may compensate the deficiency with operations such as memory swaps to keep the applications running. However, such operations may be costly to tax the performance of the whole system because of associated disk IO activities.

Usually, a memory manager may monitor memory usage in a system to ensure availability of a required capacity of free physical memory to alleviate the penalty of costly memory management operations. In some systems, if memory usage reaches a critical level, the memory manager may take memory management actions to increase the size of free memory. For example, the memory manager may look for memory pages that haven't been used for a period of time (e.g. based on the least recently used policy implemented in vm_pageout_scan( ) routine of a UNIX operating system) and page them out to disk (e.g. via swap operations). Alternatively, the memory manager may free up a portion of memory or memory pages belonging to an application or a process which occupies the largest amount of memory space among a list of currently active applications or processes. However, such memory management operations may be agnostic as to how the memory being paged out is used by the applications. As a result, a critical memory page for one application may be paged out while another low priority memory page for another application may be retained.

Therefore, existing memory management approaches are not capable of leveraging application specific memory management operations to utilize limited memory capacity in a distributive, effective and intelligent manner.

SUMMARY OF THE DESCRIPTION

In one embodiment, a notification is provided to selectively inform applications to voluntarily perform application specific operations to free up used memory. The notification may be based on an event (e.g. an event message sent from a kernel of an operating system) which applications can listen for and handle. In one embodiment, the notification may be a memory pressure notification which can occur as a system hosting the applications is running low in available physical memory. The system may perform memory management operations, such as implemented via a "pageout" method in a kernel of the system, to collect used memory across multiple applications in a system-wide manner. The notified applications may preemptively free up certain memory in application specific manners not available to the kernel.

For example, when receiving a memory pressure notification, Safari, a browser application from Apple Inc. of Cupertino, Calif., which has cached a large amount of images, can opt to release a portion of the cached images voluntarily with Safari specific memory management operations rather than wait for a system-wide memory collection (e.g. via a page-out_scan( )method) to start paging out used memory. System-wide memory collection may result in forcing Safari to surrender used memory space containing critical data for Safari. It may be beneficial from Safari's perspective to voluntarily release used memory in a Safari specific manner as it is aware of the memory it is using and can free up memory with the smallest performance hit. Additionally, Safari (or other applications) specific memory management operations may have the advantage of releasing bigger chunks of memory compared with smaller pieces (e.g. a single page of 4K bytes) typically released from system-wide memory management operations (e.g. via a kernel).

In one embodiment, smart memory decisions may be made available to applications via libraries utilizing asynchronous notifications. The kernel may generate kernel events to alert system-wide memory pressure. A message dispatching framework, such as Grand Central Dispatch (GCD) from APPLE Inc., can allow user space applications to receive or listen to kernel events for the notification. Thus, no changes may be needed for existing applications to take advantage of these kernel events via these libraries (e.g. via static or dynamic linking) to make smart memory decisions asynchronously. In some embodiments, decision making may be centralized in a kernel process regarding when to generate these events (e.g. based on memory pressure detection) and/or which applications to notify with these generated events. Memory management operations (e.g. to free up used memory), however, may be performed within notified applications in a distributed and cooperative manner without central control from the kernel.

In one embodiment, an application may register with a kernel for listening to events indicating high memory pressure. The events may allow the application an opportunity to participate in reducing memory usage. As a result, the application may aggressively allocate memory without a need to blindly guess how the memory should be conserved for other applications. In one embodiment, the application can dynamically inform the kernel about capabilities regarding how the application can contribute in reducing memory pressure when notified, such as an amount of memory guaranteed to be released, an amount of memory estimated to be released, or other applicable information.

In one embodiment, a kernel may passively receive requests and/or information from applications. In turn, the kernel may detect a status of overall memory usage in the system (e.g. a memory pressure level) and supply answers to the requests. The kernel can maintain up to date information (e.g. based on one or more queues) on application specific memory management capabilities to determine which applications should be notified in what order when high memory pressure is detected.

In one embodiment, a kernel can monitor a memory pressure level and make adjustments gradually to ensure the memory pressure level is stable. For example, the kernel can leverage received information on application specific memory management capabilities to select certain applications for releasing memory when memory pressure is high. The adjustments may include notifying one group (e.g. first group) of selected applications, waiting for a period of time, inspecting the pressure level and notifying another group (e.g. second group) of selected applications to release memory if the memory pressure level still indicates high memory pressure. The kernel may cycle through these adjustments until the pressure level stabilizes. Thus, applications and the kernel cooperatively improve memory usage of the system by passing data up and down between the applications and the kernel, including application specific memory management capabilities and the indication of high memory pressure, or other applicable data/information.

An embodiment of the present invention includes a method and apparatus that select one or more applications running in a data processing system to reduce memory usage according to information received from the applications. Notifications specifying the information including application specific memory management capabilities may be received from the applications. A status of memory usage indicating lack of available memory may be determined to notify the selected applications. Accordingly, the notified applications may perform operations for application specific memory management to increase available memory.

In an alternative embodiment, one or more queues representing ordered relationships among separate groups of running applications may be maintained in a data processing system having a level of memory usage. In response to receiving a notification from one of the running applications, the queues may be updated according to the capabilities indicated. The notification may specify capabilities of application specific memory management in the application. A message may be sent to the application according to the updated queues if the level of memory usage indicates the data processing system lacks available memory. The message may notify the application to perform operations for application specific memory management.

In an alternative embodiment, an application running in a data processing system may send a notification indicating capabilities of application specific memory management in routines included in the application. The routines may be invoked for the application to perform operations to reduce allocated memory in response to receiving a message indicating lack of available memory in the data processing system.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 6 is a flow diagram illustrating an embodiment of a process to invoke operations for application specific memory management;

DETAILED DESCRIPTION

Figure 1:
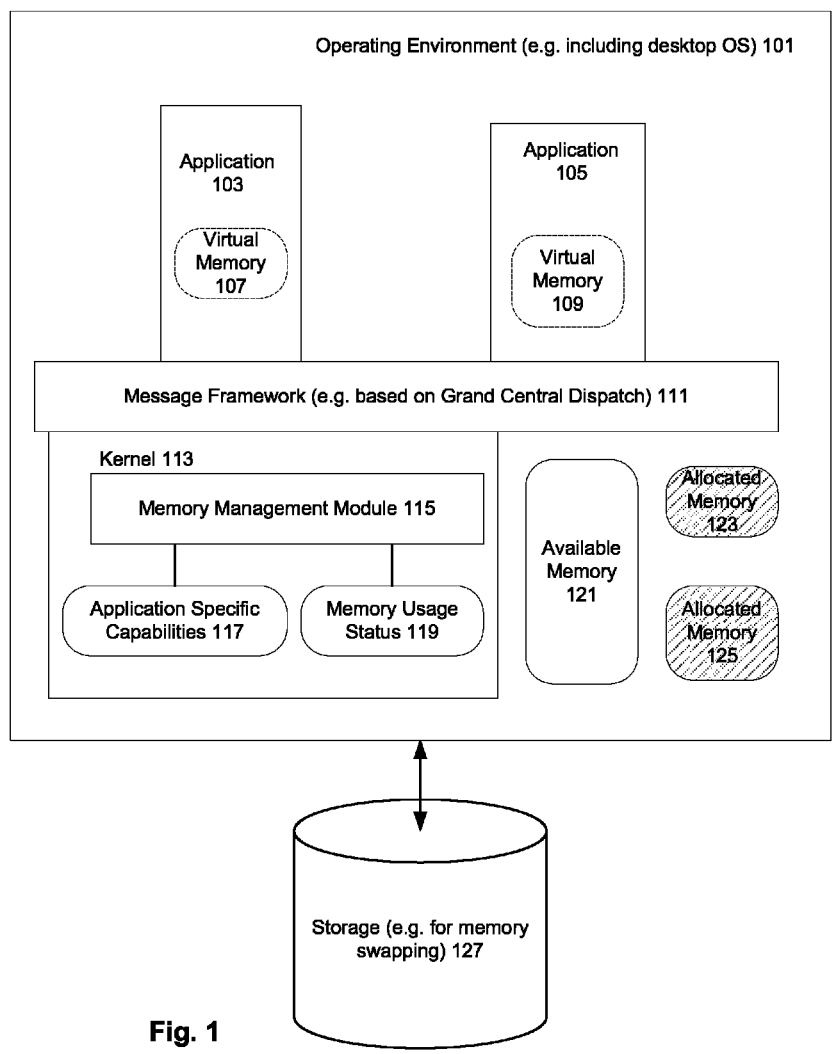
FIG. 1 is a block diagram illustrating one embodiment of a system for memory management.

A method and an apparatus for memory management are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. An API may receive parameters as disclosed or other combinations of parameters. An API may also implement functions having parameters, variables, or pointers. In addition, an API may provide the calling program code the ability to use data types or classes defined in the API and implemented in the called program code. Certain embodiments may include an environment with a calling software component interacting with a called software component through an API. A method for operating through an API in this environment includes transferring one or more function calls, messages, other types of invocations or parameters via the API. In addition to the APIs disclosed, other APIs individually or in combination can perform similar functionality as the disclosed APIs.

In one embodiment, a kernel providing an operating environment for a data processing system can monitor a level of memory usage in the system and notify a selected application when the level indicates the system is running low in available physical memory. The level of memory usage may be a value indicating a total amount of memory space already used/allocated, a size of available physical memory, or other application memory usage information. In one embodiment, the kernel can maintain a list of memory page allocations for different processes to determine the level of memory usage. Notification messages may be forwarded to selected applications via asynchronous messaging mechanism, such as a GCD framework. Libraries supporting the messaging framework to route kernel event messages to the applications may be readily linked with the applications without a need for extra development work to modify existing applications.

A kernel may be a central component of a computer operating system. The kernel may provide a bridge between applications and the actual data processing done at a hardware, such as a device hosting the applications. The kernel's responsibilities may include managing the system's resources, such as the communication between hardware and software components), memory management and process management. Usually the kernel may determine which process is executed at what time in the system.

A kernel process, such as a virtual memory manager, can trap a memory request from a user space application to activate a monitor routine to access a status or level of memory usage of a system hosting the application. The monitor routine may detect high memory pressure based on thresholds of levels, e.g. configured to represent different values directly or indirectly related to the total number of memory pages already allocated. For example, the thresholds may be based on a number of memory pages cached ready to be allocated, a number of active memory pages, a number of free memory pages, a ratio between sizes of used and available memory, or other applicable measures of memory usage, etc. In one embodiment, the monitor routine may be invoked asynchronously as a result of the kernel providing an answer for a memory request from an application (e.g. allocating a page of memory to return to the application). Effects on the status of memory usage to provide or allocate memory pages for the memory request may be evaluated to determine how to respond to the memory request.

In certain embodiments, current memory pressure may be accessed on receiving a memory request from an application. If the memory pressure is high or expected to become high with newly allocated memory pages requested, additional limitations may be applied for serving the memory request, such as reducing the number of memory pages for the request, requiring a privileged status on the application making the request, or other applicable restrictions/conditions. The kernel may decide, for example, when the memory pressure reaches certain levels, to call out a system-wide memory collection mechanism, such as pageout_scan( )method, to free out an amount of used memory to serve the memory request. The system-wide memory collection mechanism may be agonistic or independent of application specific memory management operations.

In one embodiment, a kernel can maintain multiple priority queues each representing a separate grouping of applications to notify on occurrences of high memory pressure. The kernel may select one or more priority queues to generate kernel events informing or notifying applications associated with the selected priority queues in order to allow these applications to perform application specific memory management operations to help relieve the memory pressure. Notifications to the applications may indicate that system-wide memory management operations, such as pageout_scan( ) method, may become more aggressive in claiming back used memory. Accordingly, notified applications may adjust memory allocation/de-allocation operations in application specific manner (e.g. becoming more aggressive in allocating memory pages expecting timely notifications of excessive allocation).

In one embodiment, the ordering relationship among applications in a priority queue may be based on information received from each application, such as application specific memory management capabilities. For example, an application may send a message (e.g. asynchronously) to a kernel to indicate an amount of memory the application can free up, guarantees to free up, or perform other types of memory operations with etc. when the application is notified with high memory pressure. The amount of memory indicated may be a certain size of memory (such as 1 MB, 10 MB or 1 GB, etc.), a range of memory sizes, a minimum size of memory, or other applicable memory size information. In some embodiments, an application may indicate a choice or preference of a queue (e.g. in a message to the kernel) for notification, such as a queue associated with applications which have promised or guaranteed to give up certain amount of memory when notified. Alternatively, an application may indicate which events (e.g. high memory pressure events) to listen and respond to. Messages from an application may be received as a suggestion, advice, or hint for the kernel to implement a policy (e.g. selecting and ordering application candidates) to send out notifications for application specific memory management.

In certain embodiments, a kernel may perform operations in cycles to progressively monitor and/or stabilize memory usage in a system. Within each cycle, the kernel may detect when the status indicates high memory pressure, adopt a policy to select one or more processes or applications to send alert messages, wait for a period of time (e.g. based on dynamically determined waiting period), evaluate the memory usage status, and/or adjust the policy for alerting applications. Optionally or alternatively, the kernel can make policy changes including selecting multiple applications from multiple queues, adapting a different speed in sending alerts, such as shortening waiting periods, or other applicable adjustments on the policy.

In one embodiment, applications (e.g. currently active or running) may be ordered in a special queue associated with a memory management library commonly linked in these applications to allocate and free memory. Particularly, the memory management library may implement legacy API calls such as malloc( ) and free( ) in the applications. In one embodiment, memory space allocated and freed via the memory management library or the legacy API calls may accumulate or be cached within the memory management library without being returned back to the kernel for other queues. The special queue may be based on amounts of memory allocated or accumulated via API calls to the memory management library from the applications. If high memory pressure is detected in the kernel, the special queue may be selected to determine which applications to notify to free up used memory via the memory management library. For example, an application which uses up the largest amount of memory as indicated in the special queue may be notified. Thus, existing applications do not need to make any change (i.e. with minimal development cost) to participate with the kernel for cooperative memory management. Similar queues may be applicable for other APIs accessing kernel or system resources such as socket( ) timer( ) etc.

In some embodiment, the application can forward application specific memory management capabilities when registering for receiving notifications of high memory pressure. Alternatively, the application can dynamically update the kernel with new capabilities depending on a run time state of the application. Application specific memory management capabilities may include conditions such as when an application should be notified (e.g. if the memory occupied by the application exceeds a certain value 11 MB or other applicable sizes). Optionally, an application may opt out of participating in application specific memory management (e.g. via a message to the kernel). Alternatively, the kernel may dynamically maintain a history or status indicating effectiveness of application specific memory management operations for the application, e.g. indicating changes of amounts of memory allocated by the application before and after a notification sent to the application. The kernel may not notify an application for a period of time or over certain memory management cycles if the application is not responsive to prior notifications to perform application specific memory management (e.g. without releasing at least a configured amount of occupied memory).

In one embodiment, a kernel may be configured with a kernel policy on how applications should be notified with status of system memory usage. The kernel policy may be based on application specific memory management capabilities or other applicable information received from these applications. Each application may include a user policy for application specific memory management, for example, related to what operations to perform in response to different notifications received. The kernel may directly manage kernel resources (e.g. network buffers) and/or determine which notifications (e.g. including information of memory usage status) to send to which application in what order according to the kernel policy. Cooperatively, an application, when notified by the kernel, can perform application specific memory management operations according to a user policy which may not be known to the kernel. As a result, the kernel and the applications work asynchronously together based on the two levels of kernel and user policies to mange memory usage.

In one embodiment, a kernel policy may prioritize applications to notify for high memory pressure based on sizes of memory the applications have indicated they are willing to release. For example, three game applications may have informed the kernel to send notifications if their memory usage exceeds 10 MB. A browser application (e.g. Safari) may send a memory request to the kernel. In turn, the kernel may detect high memory pressure. Consequently, the kernel may select the game applications for high memory pressure notification if their memory usage exceeds 10 MB memory space. The game applications may be notified one by one in turn and determine whether to return certain amount of memory space back. The kernel may reevaluate the status of memory usage before sending out another notification. Alternatively, the kernel may select an application to notify based on the total amount of memory used in the application.

FIG. 1 is a block diagram illustrating one embodiment of a system for memory management. In one embodiment, system 100 may be an operation system including a kernel 113 to provide memory service for applications 103, 105, which may be running concurrently. The memory service may include allocation of physical memory among multiple processes within system 101. In one embodiment, the physical memory, such as available memory 121, allocated memory 123, 125 may be based on a RAM (Random Access Memory), a flash memory or other types of memory devices compatible with system 100. Allocated memory 123, 125 may correspond to virtual memory 107, 109 for applications 103, 105 respectively. Available memory 121 may be ready for new allocation when needed. Storage 127 may be based on non-volatile memory devices, such as hard disks or other mass storage medium, to support memory swapping operations which store data moved from the physical memory to free up physical memory space allocated for the data (e.g. to increase the size of available memory 121).

In one embodiment, kernel 113 may include memory management module 115 (e.g. a virtual memory management module) to coordinate memory allocation for running applications, such as applications 103, 105, based on limited available physical memory in system 101. Memory management module 115 may monitor an overall status of memory usage of system 101, e.g. periodically, continuously or on demand. In one embodiment, memory management module 115 can update memory usage status 119 with a current status of memory usage for system 101, e.g. based on a level of physical memory used, a ratio derived from sizes of available and used physical memory, or other applicable values. Memory management module 115 may directly perform memory allocation/de-allocation operations at kernel level and/or ask selected applications to perform application specific memory management operations at user level. Thus, memory management module 115 can work cooperatively with applications 103, 105 to maintain stability of memory usage within system 101, e.g. keeping relevant values in memory usage status 119 within a preconfigured range. In certain environments, such as a desktop related operating environment, kernel 113 may be constrained from killing or asking running applications to exit to increase available memory.

In some embodiments, memory management module 115 can maintain application specific capabilities 117 storing capability information received from running applications, such as applications 103, 105 (e.g. concurrently running user level applications). The capability information may indicate effectiveness in freeing up used memory via application specific memory management operations inside an application. For example, the capability information for an application may include a size of used memory estimated to free, a size of used memory guaranteed to free, a condition on when the application should be notified (e.g. based on a level of memory usage, amount of memory occupied by the application, or other applicable indicators/data). Application specific capabilities 117 may facilitate memory management module 115 to determine which application or applications to notify when high memory pressure in the system is detected. In one embodiment, memory management module 115 may passively receive messages from runtime applications to keep application specific capabilities 117 up to date. Applications 103, 105 and memory management module 115 may listen to messages routed by message framework 111, such as GCD framework, to communicate with each other asynchronously.

Figure 2:
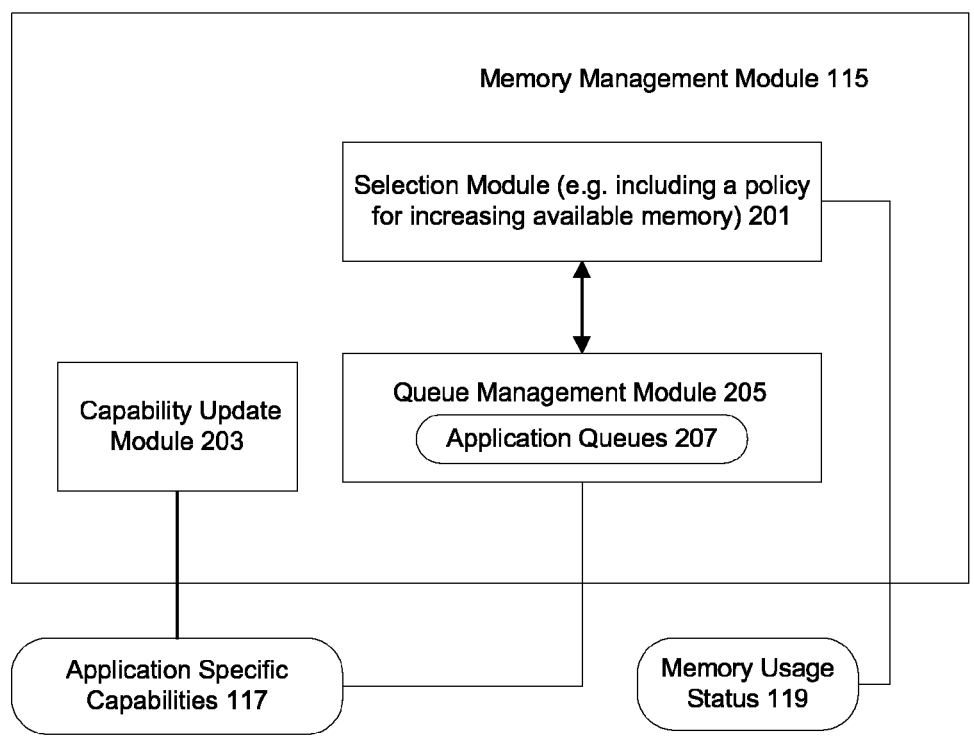
FIG. 2 is a block diagram illustrating one embodiment of a system to select applications for application specific memory management.

FIG. 2 is a block diagram illustrating one embodiment of a system to select applications for application specific memory management. System 200 may correspond to memory management module 115 of FIG. 1. In one embodiment, memory management module 115 may include capability update module 203 which maintains application specific capabilities 117. For example, capability update module 203 can ensure that application specific capabilities 117 include latest data characterizing memory management capabilities volunteered from running applications. Capability update module 203 may perform update operations on application specific capabilities 117 according to parameter data extracted from messages received from applications (e.g. via message framework 111 of FIG. 1).

In one embodiment, memory management module 115 may include queue management module 205 to maintain ordering relationships among applications according to application specific capabilities 117. An application may be associated with multiple ordering relationships with other applications. An ordering relationship may correspond to a subset of the applications as maintained in application specific capabilities 117. For example, applications which have indicated an amount of memory guaranteed to be freed up when notified may be grouped together in one group ordered by the memory size guaranteed to release by the applications when notified. Optionally, another group of applications may be based on and/or ordered by an amount of memory estimated to give up when notified. An application may belong to multiple groups according to separate ordering relationships. Each ordering relationship may correspond to a separate capability (e.g. an amount of memory guaranteed to release) received via one or more notification messages.

In certain embodiments, queue management module 205 can maintain application queues 207 including one or more queues, each representing one group of applications according to a specific ordering relationship (e.g. based on the size of memory guaranteed to give up when notified or other aspects of application specific memory management). Each element in a queue may correspond to one application. An application associated with application specific capabilities 117 may belong to zero or more queues in application queues 207. Queue management module 205 can dynamically update application queues 207 (e.g. for adding a queue, deleting a queue, reordering elements in a queue, or performing other applicable operations) according to changes made to application specific capabilities 117. Additionally, or optionally, queue management module 205 can make changes, such as rearranging the elements in a queue according to memory management policy configured in memory management module 115. For example, a first element (or head element) corresponding to an application in a queue may become the last element (or tail element) of the queue after a notification message has been sent to the application for application specific memory management.

In one embodiment, memory management module 115 may include selection module 201 to determine or select one or more applications to notify. Selected applications, when notified, may be given a chance to perform application specific memory management operations to release used memory, for example, when high memory pressure is detected. Selection module 201 may follow a selection policy configured in memory module 115 to select applications to notify according to one or more queues stored in application queues 207. For example, memory management module 115 may detect the presence of high memory pressure based on memory usage status 119 and request selection module 201 to select a memory reduction mechanism for increasing the size of available memory for the system. A memory reduction mechanism may relate to system-wide operations (e.g. garbage collection, or other application independent memory reduction operations), application specific activities (such as notifying selected applications to perform application specific memory operations), or other applicable memory management operations.

In one embodiment, selection module 201 may determine whether to solicit applications to perform application specific memory management operation. Selection module 201 may include a preference for incurring application specific memory reduction operations over enforcing system-wide memory reduction operations. For example, selection module 201 may identify one or more queues from application queues 207 and select one or more applications from the identified queues according to ordering relationships embedded in the selected queues. In some embodiments, selection module may select a queue associated with applications which have indicated (e.g. via notification messages) amounts of memory guaranteed to free up once notified. Selection module 115 can determine a total amount of memory to reclaim from applications selected from such a queue. According to the current level of memory usage in memory usage status 119, selection module 201 may determine how many applications to notify (e.g. if the level of memory usage is high, more applications may be selected). Typically, selection module 201 may cause updates of selected queues with selected applications via queue management module 205, such as reordering applications ordered in the queue such that each application can be notified in turn (e.g. in a round robin manner).

In some embodiments, selection module 201 may proceed to select system-wide memory management operations, for example, after each application indicated or registered in application queues 207 have been notified. System-wide memory management operations may be independent of application specific memory management operations in each application. For example, system-wide memory management operations may be based on memory usage frequency (e.g. least used memory pages), memory usage amount (e.g. total memory used for a process), memory usage history (e.g. last used memory pages), configurations (e.g. preconfigured priorities among different processes), and/or other application independent resource usage measures. Optionally, selection module 201 may determine (e.g. when detecting high levels of memory usage) to perform system-wide memory management operations together with application specific memory management operations (e.g. notifying selected applications for application specific memory management)

In one embodiment, memory management module 115 may detect the presence of high memory pressure, send asynchronous notifications to applications and/or performing system-wide memory management operations (e.g. according to selections from selection module 201) and, subsequently, wait for a period of time (e.g. cycle time) to reevaluate the status of memory usage. Thus, during each cycle, selected applications may be given opportunities to perform application specific memory management operations. At the end of each cycle (e.g. waking up after the period of time), memory management module 115 may access effects of application specific memory management operations as indicated in memory usage status 119. In some embodiments, based on policies configured, lengths of cycle time, selection criteria for applications to notify, or other memory management operations may be dynamically adjusted from cycle to cycle until, for example, the status of memory usage stabilizes (e.g. the memory pressure falls under a certain level).

Figure 3:
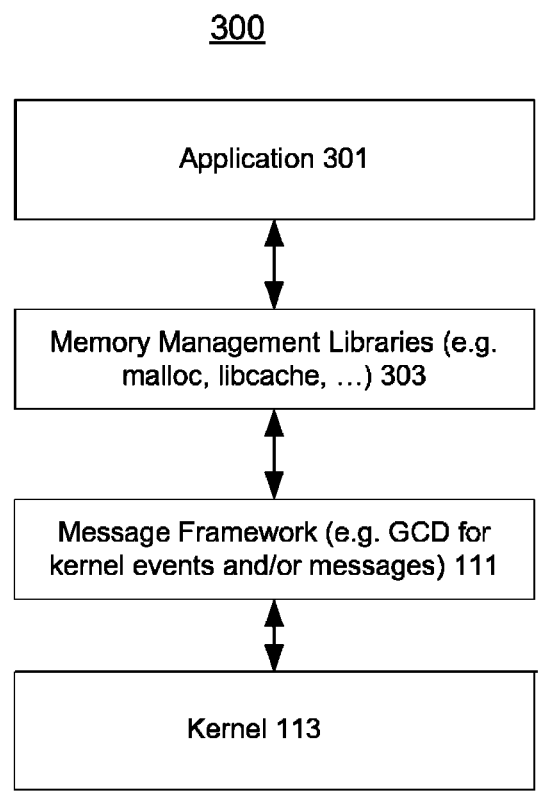
FIG. 3 is a block diagram illustrating one embodiment of a system for cooperative memory management.

FIG. 3 is a block diagram illustrating one embodiment of a system for cooperative memory management. System 300 may include kernel 113, message framework 111, and memory management libraries 303 linked with application 301, for example, within system 100 of FIG. 1. Libraries 303 may include built in decision mechanisms for memory management utilizing asynchronous notifications. Application 301 may dynamically link with libraries 303 without a need to change application source code to leverage capabilities implemented inside libraries 303. In some embodiments, application 301 may link in low level libraries like libSystem. Kernel 113 may detect system-wide memory pressure and alert user space processes such as application 301. Message framework 111 may asynchronously alerts clients, such as application 301, of kernel events caused by changes in memory usage status.

In one embodiment, a malloc manager can manage memory allocated via memory management libraries 303. Thus, API calls, e.g. for allocating/freeing memory pages, via common memory management libraries from each application (such as application 301 via memory management libraries 303) may be forwarded to the malloc manager which implements specific memory management capabilities for multiple applications. The malloc manager may communicate asynchronously with kernel 113 to request memory pages or release memory pages.

In one embodiment, the malloc manager may include memory management capabilities which maintain a pool of memory pages allocated from kernel 113. The pool of memory may be shared among multiple applications. A queue can store an ordering relationship among these applications according to, for example, the number of memory pages allocated by each application within the pool. The malloc manager may include a selection policy specifying which memory pages to reclaim back from which applications based on the queue. In one embodiment, when receiving a kernel alert of high memory pressure, the malloc manager may select the head application of the queue (e.g. the application allocated with the largest number of memory pages from the pool) to return a portion of the allocated memory back to the pool.

Figure 4:
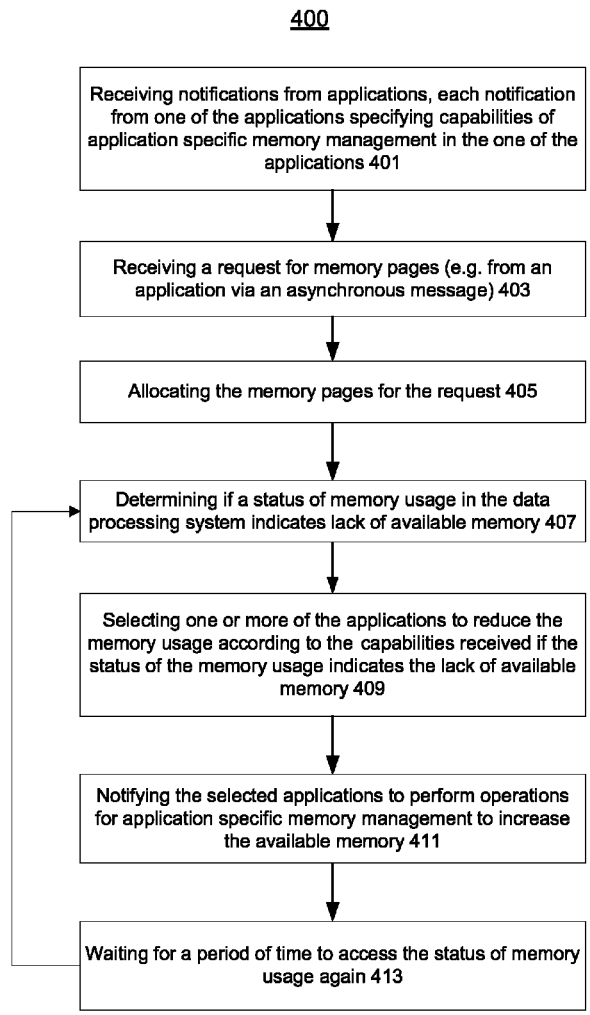
FIG. 4 is a flow diagram illustrating one embodiment of a process to selectively notify applications for application specific memory management.

FIG. 4 is a flow diagram illustrating one embodiment of a process to selectively notify applications for application specific memory management. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1. At block 401, the processing logic of process 400 can receive notifications from applications or processes to provide characteristics or features for application or process specific capabilities. Particularly, a notification, such as asynchronous message via message framework 111 of FIG. 1, from one of the applications can register capabilities of application specific memory management in the corresponding application. Alternatively, the notification can update or overwrite existing records of such capabilities for the corresponding applications. A capability may be represented by a number, an attribute value pair, a string value, a list of values or other applicable data.

At block 403, the processing logic of process 400 can receive a request for memory pages (e.g. from an application via an asynchronous message) 403, e.g. based on an API call. In response, at block 405, the processing logic of process 400 may allocate memory pages for the request, such as via memory management module 115 of FIG. 1.

In one embodiment, the processing logic of process 400 may allocate a portion of available physical memory, such as available memory 121 of FIG. 1, and/or perform swapping operations to claim back certain amount of physical memory already allocated for an answer to the request.

At block 405, substantially at the same time as block 403, the processing logic of process 400 may determine if a status of memory usage indicates lack of available memory, for example, based on memory usage status 119 of FIG. 1. The processing logic of process 400 may derive one or more measures of physical memory in a system, such as a ratio between the amount of physical memory currently available and the amount of physical memory currently used or other applicable measures of memory usage. In one embodiment, indication of lack of available memory may be based on whether a level of memory usage (e.g. a current measure of amount of memory already allocated or used) exceeds a threshold level (e.g. preconfigured or dynamically determined).

If a status of memory usage indicates lack of available memory, the processing logic of process 400 may, at block 409, select one or more applications to reduce the memory usage according to capabilities received from these applications. For example, the processing logic of process 400 may identify one or more queues representing different groups of the applications, such as in application queues 207 of FIG. 2, to select one or more applications from these identified queues. The selection may be based on a selection policy which may, for example, give higher priority to a queue based on how much memory applications guarantee to free up when notified than another queue based on how much memory applications estimate to free up when notified. Alternatively or optionally, the policy may specify how many applications to notify in a batch, e.g. based on the total amount of memory associated with capabilities recorded or maintained (e.g. in the queues) for the selected applications. At block 411, the processing logic of process 400 may notify the selected applications to perform operations for application specific memory management to increase the available memory.

In one embodiment, at block 413, the processing logic of process 400 may wait for a period of time (or a waiting period for a cycle of message notification), subsequent to sending out notifications to selected applications in a batch, to access a status of memory usage for the system. Selected applications may be notified to perform application specific memory management operations during the period of time. As the applications are selected heuristically according to the capabilities these application advocate, effects of application specific memory management operations in the system may not be available until when the status of memory usage is accessed again. In some embodiments, the waiting period may be dynamically adjusted according to a policy. For example, the processing logic of process 400 may more aggressively bring up available memory in the system by decreasing the waiting period, increasing the number of applications selected to notify (in a cycle as a batch), or applying other applicable mechanisms. The processing logic of process 400 may determine the status of memory usage at block 407 and proceed with additional cycles until the status of memory usage stabilizes.

Figure 5:
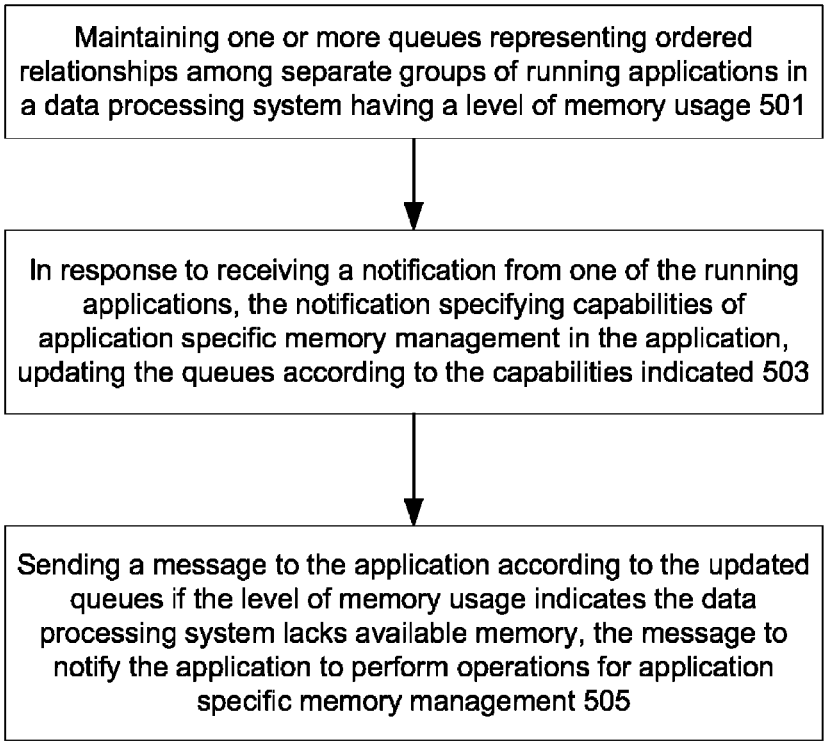
FIG. 5 is a flow diagram illustrating one embodiment of a process to maintain ordering relationships of applications for memory management.

FIG. 5 is a flow diagram illustrating one embodiment of a process to maintain ordering relationships of applications for memory management. Exemplary process 500 may be performed by a processing logic that may comprise hardware (circuitry, dedicated logic, etc.), software (such as is run on a dedicated machine), or a combination of both. For example, process 500 may be performed by some components of system 100 of FIG. 1. At block 501, the processing logic of process 500 may maintain one or more queues, e.g. application queues 207 of FIG. 2, representing ordered relationships among separate groups of running applications in a data processing system having a level of memory usage, such as indicated in memory usage status 119 of FIG. 1.

At block 503, according to one embodiment, the processing logic of process 500 may receive a notification from one of the running applications, e.g. via message framework 111 of FIG. 1. The processing logic of process 500 may passively listen to notifications asynchronously. The notification may specify capabilities of application specific memory management in the originating application. In response, the processing logic of process 500 may update the queues according to the capabilities indicated.

In one embodiment, at block 505, the processing logic of process 500 may send a message to an application (or more than one applications) selected according to the latest updated queues when detecting high memory pressure, for example, indicating lack of available physical memory in the system when a level of memory usage is above a threshold value. The message may notify the application to perform operations for application specific memory management. In certain embodiments, once an application selected from a queue is notified (or alerted), the queue may be updated such that the selected application is reassigned with the lowest priority in the queue (i.e. least likely to be selected from the queue) without changing ordering relationships among other applications in the queue.

FIG. 6 is a flow diagram illustrating an embodiment of a process to invoke operations for application specific memory management. Exemplary process 600 may be performed by a processing logic that may comprise hardware (circuitry, dedicated logic, etc.), software (such as is run on a dedicated machine), or a combination of both. For example, at block 601, process 600 may be performed by some components of system 100 of FIG. 1. At block 601, the processing logic of process 600 may send a request for allocating memory for an application, such as application 103 of FIG. 1. The processing logic of process 600 may call an API for the request. The application may include routines or instructions for performing memory management operations specific for the application. For example, the application can maintain a list of memory caches for images or other data prioritized according to factors relevant to run time operations (or run time states) of the application (e.g. for providing better user experiences or other applicable effects etc.). The routines may be capable of determining which memory caches to free up to be most effective in reducing memory usage with least impact in operations of the applications according to application run time state, which may be private to the application and not available to other processes.

At block 603, the processing logic of process 600 may send a notification asynchronously to a kernel, such as kernel 113 of FIG. 1, to indicate capabilities of application specific memory management included in an application. The notification may be a message with parameters representing heuristic values characterizing the capabilities. The processing logic of process 600 may indicate the memory management capabilities to register for kernel alerts of high memory pressure in a system. In one embodiment, memory management capabilities may change during run time according to different status of operations. The processing logic of process 600 may update the kernel as the associated memory management capabilities change.

In one embodiment, at block 605, the processing logic of process 600 may receive a message, e.g. kernel alert message, indicating lack of available memory in the system. In response, the processing logic of process 600 may invoke routines to perform application specific memory management operations. In certain embodiments, the processing logic of process 600 may determine whether to ignore the alert without performing application specific memory management operations according to a run time state of an application. For example, the processing logic of process 600 may determine no excessive use of memory inside the application (e.g. size of total image cached is within a configured value) without performing application specific operations for memory management.

Figure 7:
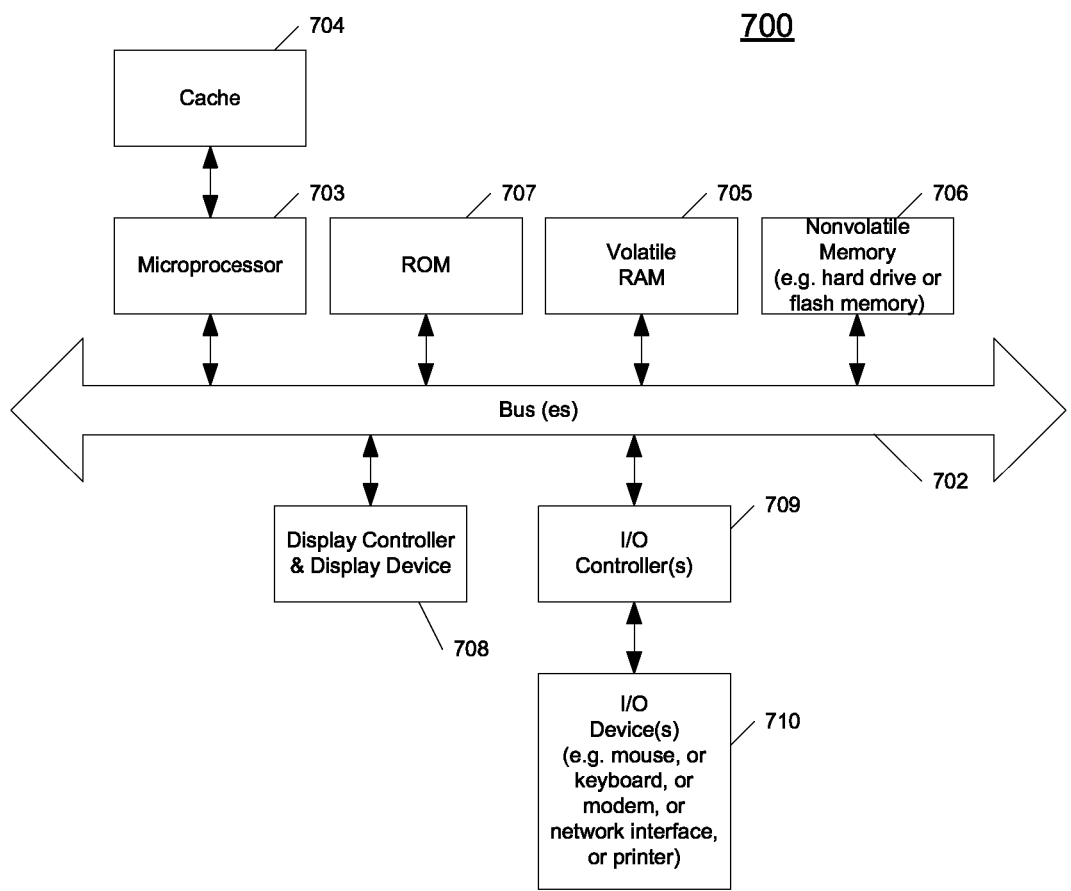
FIG. 7 illustrates one example of a typical computer system which may be used in conjunction with the embodiments described herein.

FIG. 7 shows one example of a computer system which may be used with one embodiment the present invention. For example, the system 700 may be implemented as a part of the systems shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 701, which is a form of a data processing system, includes a bus 703 which is coupled to a microprocessor(s) 705 and a ROM (Read Only Memory) 707 and volatile RAM 709 and a non-volatile memory 711. The microprocessor 703 may retrieve the instructions from the memories 707, 709, 711 and execute the instructions to perform operations described above. The bus 703 interconnects these various components together and also interconnects these components 705, 707, 709, and 711 to a display controller and display device 713 and to peripheral devices such as input/output (I/O) devices which may be mice, keyboards, modems, network interfaces, printers and other devices which are well known in the art. Typically, the input/output devices 715 are coupled to the system through input/output controllers 717. The volatile RAM (Random Access Memory) 709 is typically implemented as dynamic RAM (DRAM) which requires power continually in order to refresh or maintain the data in the memory.

The mass storage 711 is typically a magnetic hard drive or a magnetic optical drive or an optical drive or a DVD RAM or a flash memory or other types of memory systems which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine readable non-transient storage medium having instructions therein, which when executed by a machine, causes the machine to perform a method comprising:
   receiving notifications from applications running in a data processing system, each notification from one of the applications specifying capabilities of application specific memory management in the one of the applications;
   determining one or more measures of memory usage for the applications, the capabilities indicating at least one of the measures for the one of the applications;
   sorting the applications into one or more groups, each group including at least one of the applications sorted according to one of the measures;
   selecting one or more of the applications to reduce memory usage according to the capabilities received if a status of the memory usage indicates lack of available memory;
   selecting at least one of the groups, wherein the selected groups include the selected applications; and
   performing operations for application specific memory management to increase the available memory;
   wherein the capabilities include an amount of memory guaranteed to be freed by the one of the applications,
   wherein one of the measures corresponds to the amount of memory guaranteed to be freed by the one of the applications,
   wherein one of the selected groups of applications are sorted according to the one of the measures, and
   wherein at least one of the selected applications is associated with a largest amount of memory guaranteed to be freed sorted in the one of the selected groups of applications.

2. The medium of claim 1, the method further comprising:
   determining if the status of memory usage in the data processing system indicates the lack of available memory; and
   updating the capability list with the capabilities received from the one of the applications, wherein the capability list storing latest capabilities received from the applications for application specific memory management.

3. The medium of claim 2, wherein the update comprises:
   appending the capability list with the capabilities associated with the one of the applications if the capability list does not indicate the one of the applications is capable of application specific memory management, wherein the updated capability list indicates the one of the application is capable of application specific memory management with the capabilities.

4. The medium of claim 2, wherein the determination of the status of memory usage comprises:
   identifying one or more memory usage parameters for the data processing system, each memory usage parameter indicating a physical size of a type of memory in the data processing system; and
   deriving the status of memory usage from the one or more memory usage parameters.

5. The medium of claim 4, wherein the memory usage parameters include a number indicating a size of available memory.

6. The medium of claim 4, wherein the memory usage parameters include a number indicating a size of used memory in user space.

7. The medium of claim 4, wherein the memory usage parameters include a ratio between an amount of used memory and an amount of available memory.

8. The medium of claim 4, wherein the derivation is based on a ratio between two of the memory usage parameters.

9. The medium of claim 4, wherein the status of memory usage includes a numerical value, the method further comprising:
   configuring a bounded range for the memory usage; and
   comparing the numerical value with the threshold level, wherein the status of the lack of available memory is indicated if the numerical value is outside of the bounded range.

10. The medium of claim 1, wherein the capabilities indicate an amount of memory for memory management operations to be performed by the one application.

11. A computer implemented method, comprising
   receiving notifications from applications running in a data processing system, each notification from one of the applications specifying capabilities of application specific memory management in the one of the applications;
   determining one or more measures of memory usage for the applications, the capabilities indicating at least one of the measures for the one of the applications;

sorting the applications into one or more groups, each group including at least one of the applications sorted according to one of the measures;

selecting at least one of the groups selecting one or more of the applications to reduce the memory usage according to the capabilities received if a status of the memory usage indicates lack of available memory, wherein the selected groups include the selected applications; and performing operations for application specific memory management to increase the available memory;

wherein the capabilities include an amount of memory guaranteed to be freed by the one of the applications, wherein one of the measures corresponds to the amount of memory guaranteed to be freed by the one of the applications, wherein one of the selected groups of applications are sorted according to the one of the measures and wherein at least one of the selected applications is associated with a largest amount of memory guaranteed to be freed sorted in the one of the selected groups of applications.

12. A computer implemented method, comprising receiving notifications from applications running in a data processing system, each notification from one of the applications specifying capabilities of application specific memory management in the one of the applications;

determining one or more measures of memory usage for the applications, the capabilities indicating at least one of the measures for the one of the applications;

sorting the applications into one or more groups, each group including at least one of the applications sorted according to one of the measures;

selecting one or more of the applications to reduce the memory usage according to the capabilities received if a status of the memory usage indicates lack of available memory;

selecting at least one of the groups, wherein the selected groups include the selected applications; and performing operations for application specific memory management to increase the available memory, wherein each of the applications are linked with a common library for memory allocation, wherein one of the measures corresponds to an amount of memory allocated via the common library for each of the applications, wherein one of the selected groups of applications are sorted according to the one of the measures and wherein at least one of the selected applications is associated with a largest amount of memory allocated via the common library sorted in the one of the selected groups of applications.

13. The medium of claim 10, wherein each group of applications is stored as a queue sorted according to one of the measures associated with the group of applications.

14. The medium of claim 13, wherein a special one of the groups of applications correspond to a special queue, wherein the special queue is associated a memory management library called via API (application programming interface) by the special group of applications and wherein memory space allocated and freed via the API calls is cached within the memory management library.

15. The medium of claim 1, wherein each of the selected applications is capable of application specific memory management, further comprising:

determining a first waiting period subsequent to the notification of the selected application;

waiting for the first waiting period;

determining, subsequent to the waiting for the first waiting period, if a subsequent status of memory usage in the data processing system indicates the lack of available memory after the first waiting period; and notifying an alternative one or more of the applications to reduce the memory usage if the status of the subsequent memory usage indicates the lack of available memory, wherein number of the alternative one or more of the applications is larger than number the selected one or more applications.

16. The medium of claim 15, wherein whether the lack of available memory is indicated in the data processing system is determined after a second waiting period subsequent to the notification of the alternative one or more of the applications and wherein the first waiting period and the second waiting period are dynamically determined for progressive stabilization of the memory usage.

17. A machine readable non-transient storage medium having instructions therein, which when executed by a machine, causes the machine to perform a method comprising receiving notifications from applications running in a data processing system, each notification from one of the applications specifying capabilities of application specific memory management in the one of the applications;

determining one or more measures of memory usage for the applications, the capabilities indicating at least one of the measures for the one of the applications;

sorting the applications into one or more groups, each group including at least one of the applications sorted according to one of the measures;

selecting one or more of the applications to reduce the memory usage according to the capabilities received if a status of the memory usage indicates lack of available memory;

selecting at least one of the groups, wherein the selected groups include the selected applications; and performing operations for application specific memory management to increase the available memory, wherein each of the applications are linked with a common library for memory allocation, wherein one of the measures corresponds to an amount of memory allocated via the common library for each of the applications, wherein one of the selected groups of applications are sorted according to the one of the measures and wherein at least one of the selected applications is associated with a largest amount of memory allocated via the common library sorted in the one of the selected groups of applications.

* * * * *